United States Patent
Gordiyenko et al.

(10) Patent No.: US 8,489,032 B2
(45) Date of Patent: Jul. 16, 2013

(54) SYSTEM AND METHOD FOR SENSITIVITY MEASUREMENT IN WIRELESS MOBILE STATIONS

(75) Inventors: Anatoliy Gordiyenko, Waterloo (CA); Alexei Skarine, Waterloo (CA); Emil Serban, Waterloo (CA); Xiaoqi (Erick) Wang, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 819 days.

(21) Appl. No.: 12/631,981

(22) Filed: Dec. 7, 2009

(65) Prior Publication Data
US 2011/0136485 A1    Jun. 9, 2011

(51) Int. Cl.
*H04B 17/00*    (2006.01)

(52) U.S. Cl.
USPC ............... 455/67.11; 455/67.16; 455/67.14; 455/552.1; 455/450; 455/452.1; 370/208; 370/332; 370/203; 370/248; 370/252

(58) Field of Classification Search
USPC ............ 455/424, 67.1, 67.6, 67.4, 552, 69, 455/67.11, 67.16, 67.14, 552.1, 450, 452.1; 370/208, 332, 203, 248, 252
See application file for complete search history.

(56) References Cited

U.S. PATENT DOCUMENTS

| | | | |
|---|---|---|---|
| 6,272,322 B1 * | 8/2001 | Su | 455/67.14 |
| 7,359,727 B2 * | 4/2008 | Tsien et al. | 455/522 |
| 2006/0239198 A1 | 10/2006 | Mlinarsky et al. | |
| 2007/0207756 A1 * | 9/2007 | Qi et al. | 455/226.1 |
| 2007/0207757 A1 * | 9/2007 | Qi et al. | 455/226.1 |
| 2007/0207758 A1 * | 9/2007 | Qi et al. | 455/226.2 |
| 2008/0031144 A1 | 2/2008 | Kawamoto et al. | |
| 2008/0151763 A1 | 6/2008 | Lee et al. | |

FOREIGN PATENT DOCUMENTS

| | | | |
|---|---|---|---|
| EP | 1696682 | * | 8/2006 |
| EP | 1696682 A1 | | 8/2006 |

OTHER PUBLICATIONS

CTIA Certification, "Test Plan for Mobile Station Over the Air Performance", Revision 2.1, Apr. 2005.*
Agilent AN 1314, "Testing and Troubleshooting Digitial RF Communications Receiver Designs", Printed in USA May 2000.*
Matias Erny Reichl Hoffmann, Response to European Search Report filed Jul. 19, 2010, in respect of European Patent Application No. 09178225.0.
3GPP conformance specification 51.010-1—http://www.3gpp.org/ftp/Specs/html-info/51010-1.htm.
3GPP conformance specification 34.121-1—http://www.3gpp.org/ftp/Specs/html-info/34121-1.htm.
CTIA standard Test Plan for TIS and EIS measurements, Apr. 2005.
Agilent AN 1314—Testing and Troubleshooting Digital RF Communications Receiver Designs, May 2000.

* cited by examiner

*Primary Examiner* — Manpreet Matharu
(74) *Attorney, Agent, or Firm* — Norton Rose Canada LLP

(57) ABSTRACT

A system and method is provided for performing a wireless reception performance test between a wireless device and a base station emulator. The method comprises generating a path loss correction factor. The path loss correction factor compensates for path loss from an antenna port of the base station emulator to an antenna port of the wireless device. The method further comprises transmitting from the base station emulator at least a further signal transmission. The further signal transmission includes the path loss correction factor such that the transmission power of the further signal transmission removes the effect of path loss from the wireless reception performance test.

13 Claims, 9 Drawing Sheets

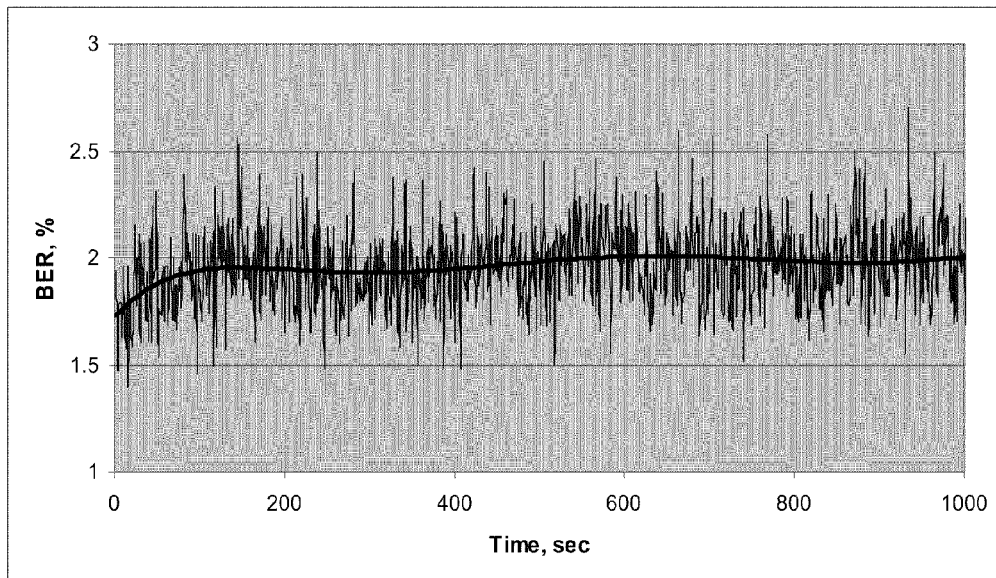
FIG. 6 - BER vs. time
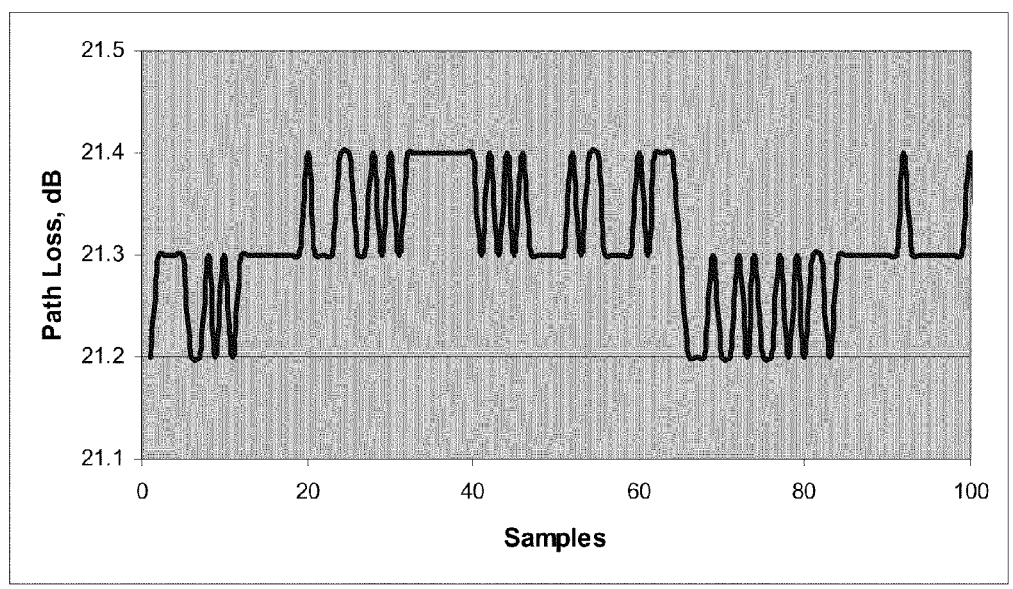
FIG. 7 - Path loss variation

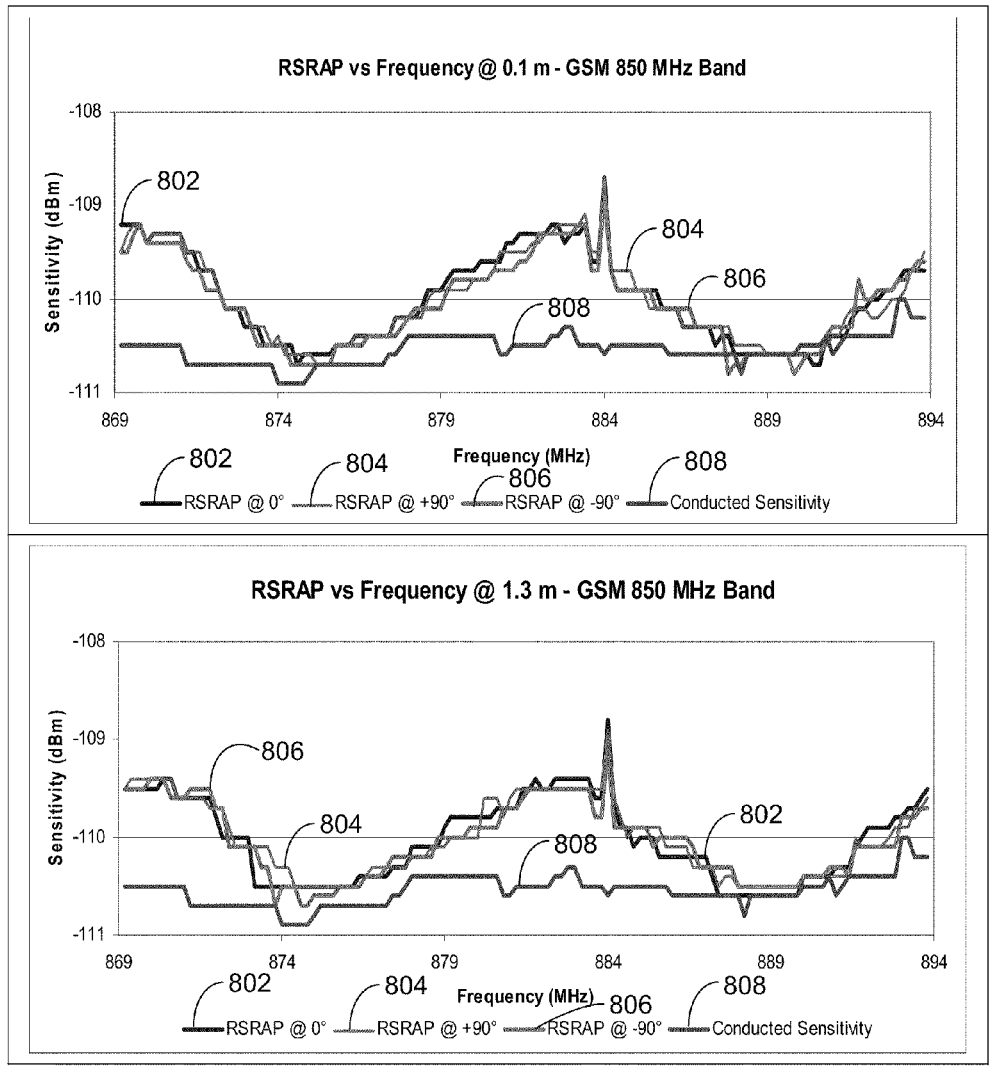
FIG. 8a - RSRAP for different azimuth angles and distances to wireless device under test and conducted sensitivity - GSM 850 MHz Band.

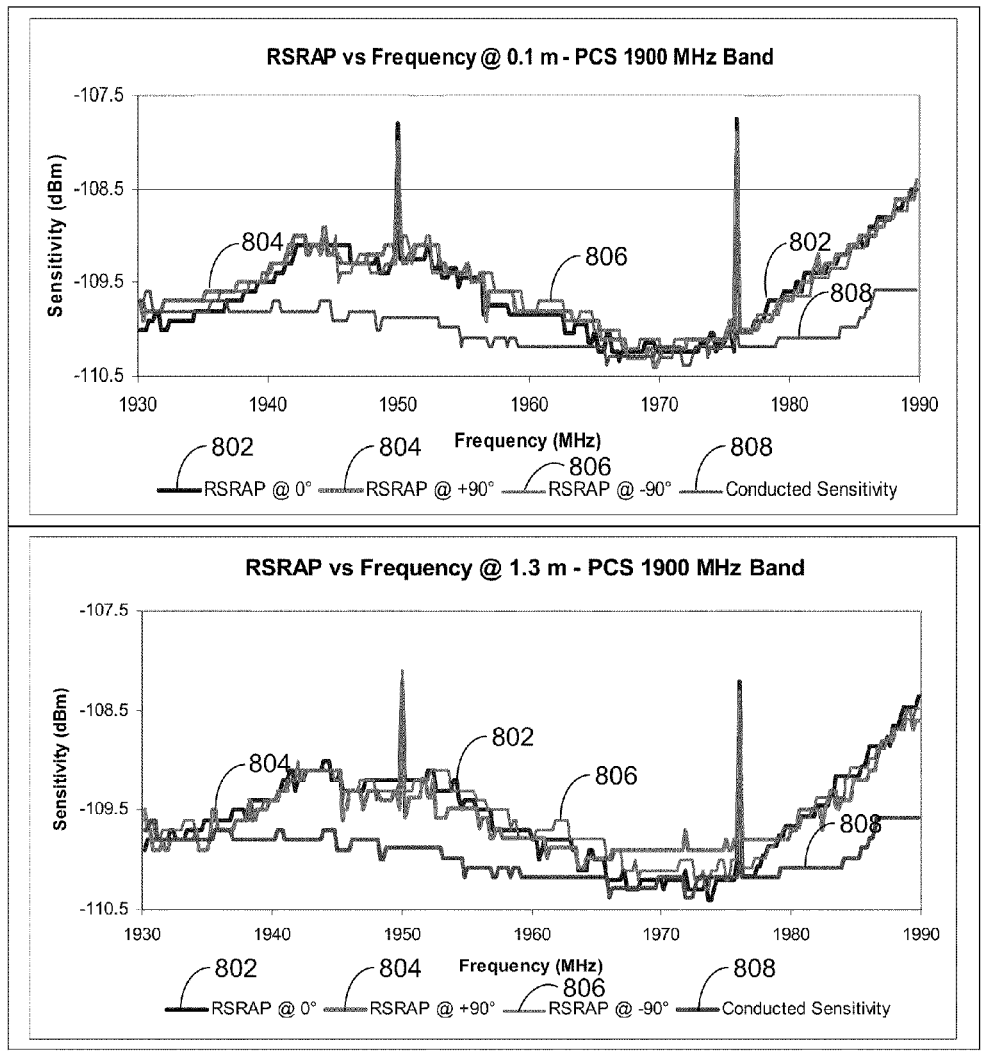
FIG. 8b - RSRAP for different azimuth angles and distances to wireless device under test and conducted sensitivity - PCS 1900 MHz Band.

US 8,489,032 B2

SYSTEM AND METHOD FOR SENSITIVITY MEASUREMENT IN WIRELESS MOBILE STATIONS

TECHNICAL FIELD

The present disclosure relates generally to telecommunications with portable devices, and more particularly to a system and method for sensitivity measurement in wireless mobile stations.

BACKGROUND

There are two standard test methods, which are widely used for sensitivity measurement of wireless mobile stations. Firstly, Third Generation Partnership Project (3GPP) conformance specifications 51.010-1 and 34.121-1 contain a test description and define limits for receiver conducted sensitivity. The test setup includes only a base station emulator, which is directly connected to the antenna port of the mobile station. This method suffers from the disadvantage that only sensitivity degradation issues caused by conduction within interconnects can be revealed.

Secondly, the CTIA standard Test Plan for Mobile Station over the Air Performance outlines total isotropic sensitivity (TIS) and effective isotropic sensitivity (EIS) as measures of mobile downlink performance. Radiated TIS and EIS tests are oriented to verify antenna performances. These kinds of tests allow for exposure to all kinds of mobile station electromagnetic compatibility issues.

BRIEF DESCRIPTION OF THE DRAWINGS

Reference will now be made to the drawings, which show by way of example, embodiments of the present disclosure, and in which:

FIG. 6 shows in graph form a measurement of bit error rate versus time in accordance with one embodiment;

FIG. 7 shows in graph form a measurement of path loss (dB) versus samples in accordance with one embodiment.

FIG. 8a shows in graph form two sets of tests results showing sensitivity (dBm) as a function of frequency for the GSM 850 Mhz frequency bands at two different distances (0.1 m and 1.3 m) in accordance with one embodiment;

FIG. 8b shows in graph form two sets of tests results showing sensitivity (dBm) as a function of frequency for the PCS 1900 Mhz frequency bands at two different distances (0.1 m and 1.3 m) in accordance with one embodiment.

It will be noted that throughout the appended drawings, like features are identified by like reference numerals.

DETAILED DESCRIPTION

One aspect of the description provides a system and method for performing a wireless reception performance test between a wireless device and a base station emulator. The method comprises generating a path loss correction factor. The path loss correction factor compensates for path loss from an antenna port of the base station emulator to an antenna port of the wireless device. The method further comprises transmitting from the base station emulator at least a further signal transmission. The further signal transmission includes the path loss correction factor such that the transmission power of the further signal transmission removes the effect of path loss from the wireless reception performance test.

Another aspect of the description provides a method for performing a wireless reception performance test on a wireless device in wireless communication with a base station emulator. The method comprises generating a path loss correction factor, the path loss correction factor for compensating for path loss from an antenna port of the base station emulator to an antenna port of the wireless device; and receiving at least a further signal transmission from the base station emulator. The further signal transmission includes the path loss correction factor such that the transmission power of the further signal transmission removes the effect of path loss from the wireless reception performance test.

Yet another aspect of the description provides a method in a base station emulator for performing a wireless reception performance test on a wireless device. The method comprises generating a path loss correction factor, the path loss correction factor for compensating for path loss from an antenna port of the base station emulator to an antenna port of the wireless device, and transmitting to the wireless device at least a further signal transmission. The further signal transmission includes the path loss correction factor such that the transmission power of the further signal transmission removes the effect of path loss from the wireless reception performance test.

Figure 1:
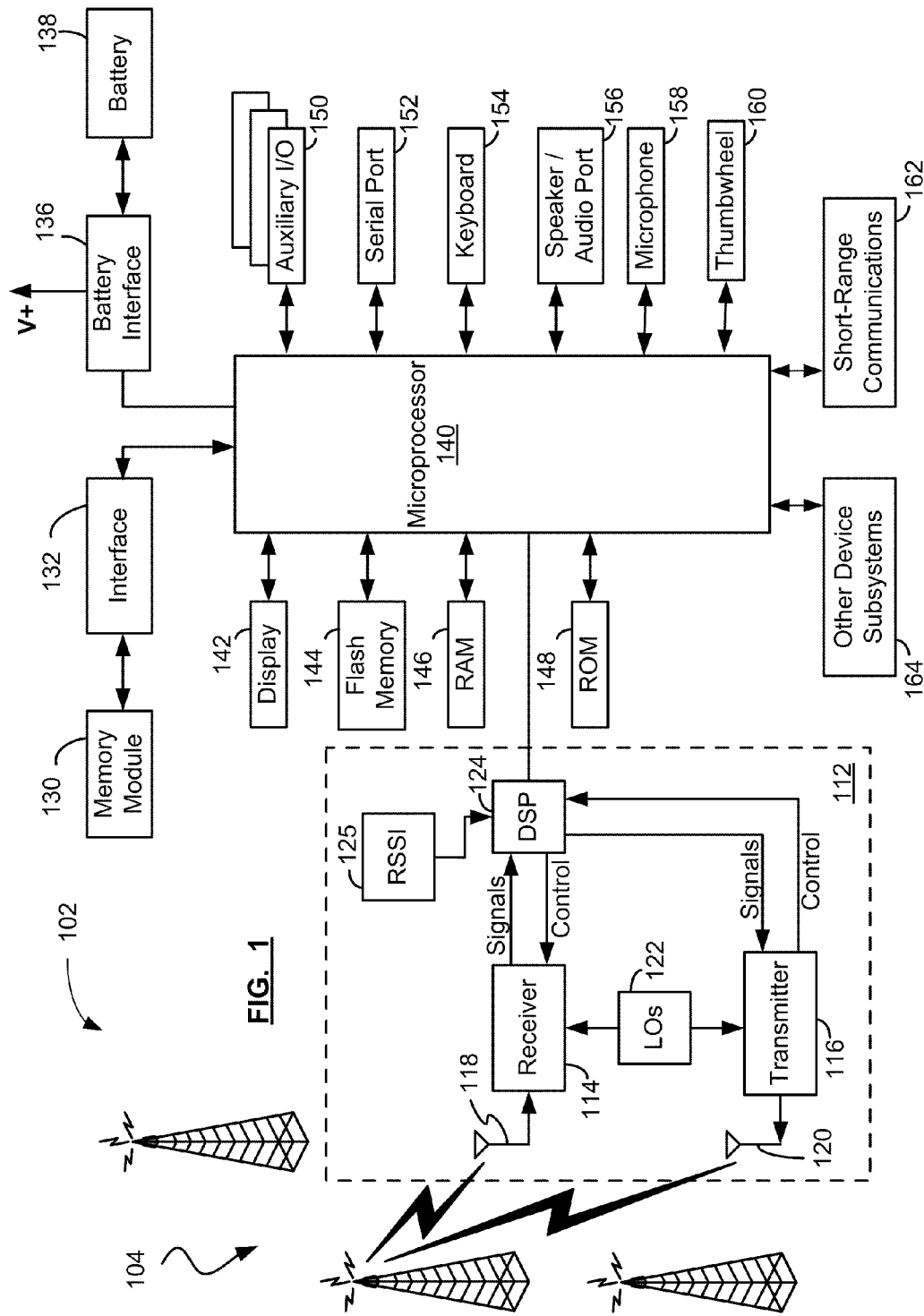
FIG. 1 shows in block diagram form a wireless device suitable for implementing a system and method for sensitivity measurement in accordance with one embodiment.

Reference is first made to FIG. 1, which shows a block diagram illustrating a portable wireless device 102 that may be used for implementing a system and method for sensitivity testing in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. The communication subsystem 112 may also have a received signal strength indicator (RSSI) 125. In one example, the RSSI 125 may be connected to the DSP 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a navigation input device 160 such as a clickable thumbwheel, thumbwheel, or set of scroll buttons or trackball, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the navigation input device 160, for example, may be used for both communication-related functions, such as entering a text message for transmission over the wireless network 104, and executing device-resident functions such as a calculator or task list. In one example, the keyboard 154 and the display 142 may be implemented as an integrated touch screen device where a user touches the touch screen 142, 154 to provide input for the microprocessor 140 in response to options shown on the display 142. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices such as external hard drives, flash drives, or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104; the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the navigation input device 160 in conjunction with the display 142 and possibly the auxiliary I/O device 150. The keypad 154 may be either a complete alphanumeric keypad or telephone-type keypad or a keypad displayed on the display 142 of the touch screen 142, 154.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
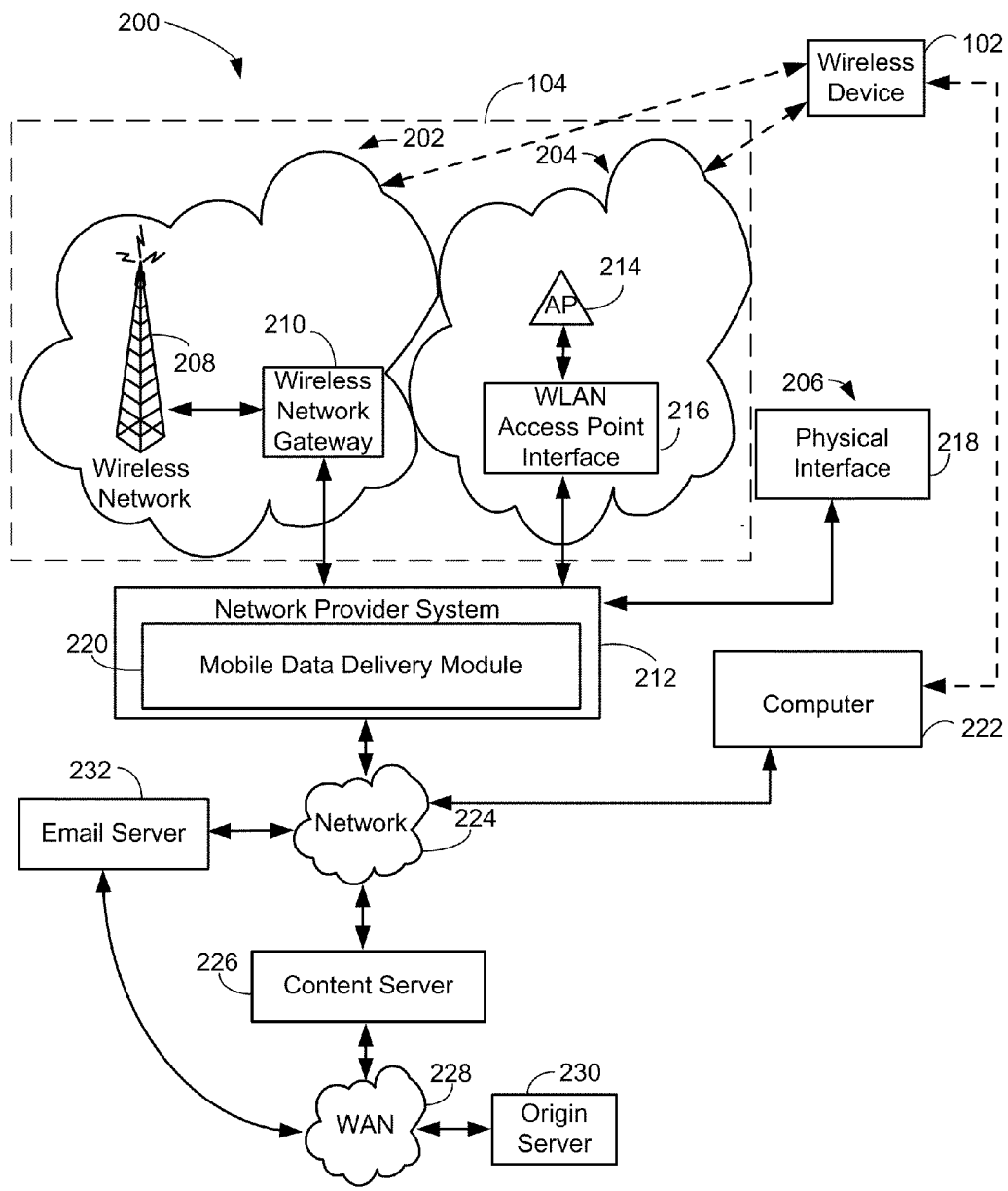
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Evolution-Data Optimized (EV-DO), 3G or 4G based networks.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
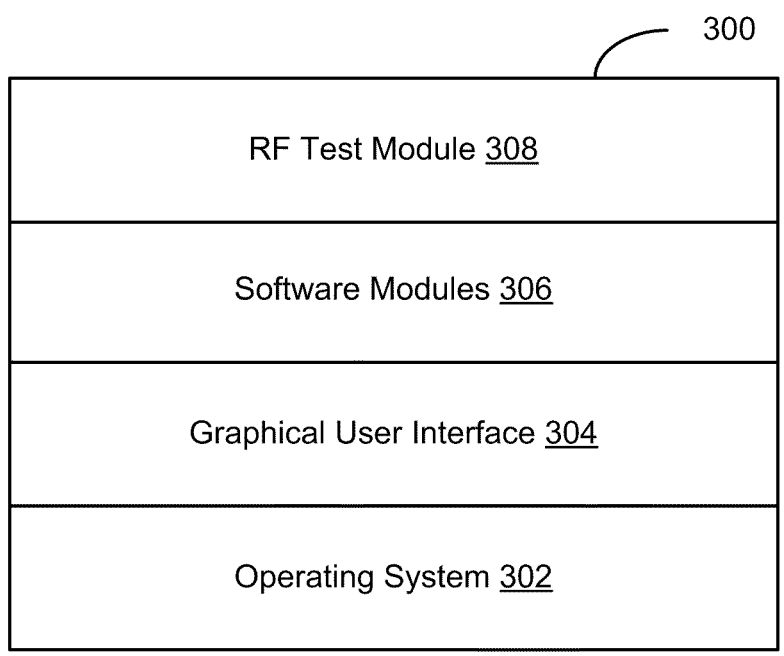
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154 or touch screen 142,154, the clickable thumbwheel 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a radio frequency (RF) test module 308. The RF test module 308 interacts with aspects of the GUI 304 and OS 302 to provide for sensitivity measurement as will be described in greater detail below. In one example, the RF test module 308 may be integrated into the OS 302 or the GUI 304 and may not be a discrete module 308 as shown in FIG. 3, depending on the design criteria of a particular application. The RF test module 308 may save and/or retrieve data in the memory 300. The memory 300 may be used by the RF test module 308 for saving information, either temporarily or permanently. Aspects of the operation of the RF test module 308 and interaction with this module are described in more detail below.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102 (e.g., A computer program product comprising a computer readable medium having computer readable code stored thereon, for execution by a processor).

Alternatively, the programmed instructions may be embedded in a computer-readable, signal-bearing medium (as opposed to the computer readable medium, discussed above) that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
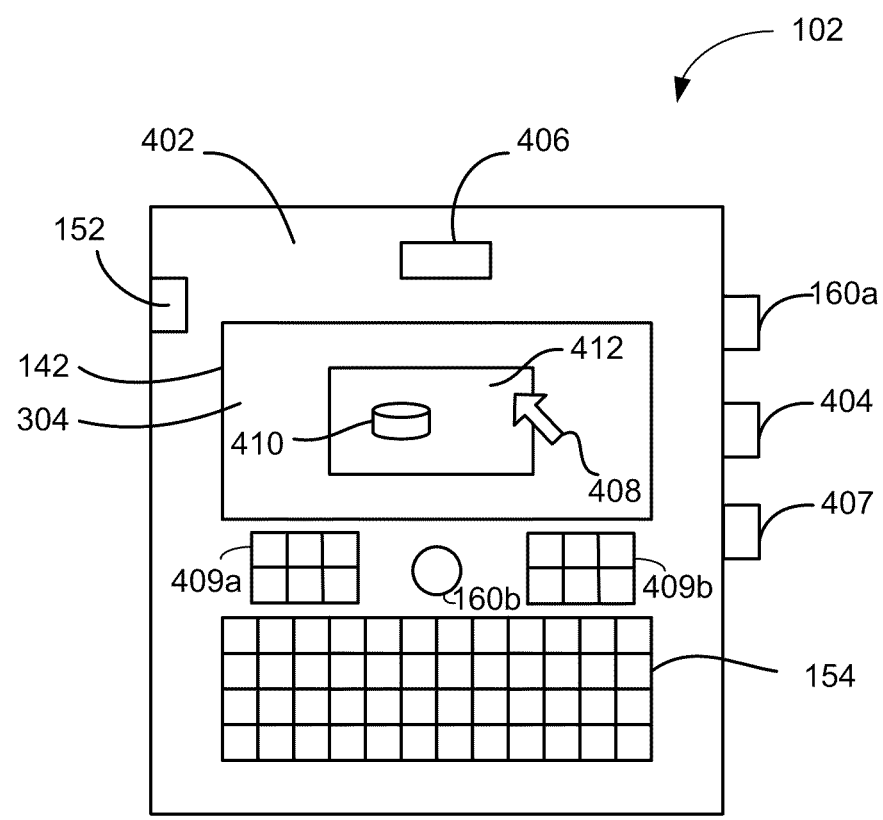
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Alternatively, the discrete keypad 154 may not be used, the display 142 may occupy most of the front side of the casing 402, and the keypad 154 may be integrated with the display 142, as the display 142 is implemented as a touch screen 142, 154 display also accepting input form the user. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306, 308 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the navigation input device 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input, pointing device, or touch screen device to position a pointer or cursor 408 over an object 410 (i.e., "pointing" at the object) and by "clicking" on the object 410 (e.g., by depressing the navigation input device 160 or a button on the keyboard 154, touching an appropriate position on the touch screen 142, 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

Testing the effect of spurious emission in a radio frequency (RF) receiver is one of the most important and time consuming stages of RF design verification for modern multisystem wireless mobile stations (e.g., incorporating the wireless device 102). There are many sources of spurious signals, which may cause receiver sensitivity degradation, including internal transmitters (e.g., the transmitter 116), clock oscillators (e.g., the oscillator 122), digital components and circuits, including digital cameras and displays (e.g., the display 142), as well as traces and planes of printed circuit boards (PCBs). Propagation mechanisms of the spurious signals may be categorized into following types: conduction through physical interconnects (e.g., transmission lines or PCB traces within the wireless device 102), radiation trough free space, or dielectric and coupling of energy by electric or magnetic fields. Sensitivity tests based on bit error rate (BER) measurement is one method to estimate the quality of a receiver in the presence of spurious emissions and reveal any electromagnetic compatibility (EMC) issues.

There are two standard test methods, which are widely used for wireless device sensitivity measurements. Third Generation Partnership Project (3GPP) conformance specifications 51.010-1 and 34.121-1 contain test descriptions and define limits for receiver conducted sensitivity. The test setup includes only a base station emulator, which is directly connected to the antenna port of a wireless device. The disadvantage of this method is that only sensitivity degradation issues caused by conduction within interconnects can be revealed.

The CTIA standard Test Plan for Mobile Station over the Air Performance outlines total isotropic sensitivity (TIS) as measure of wireless device downlink performance, according to the following equation:

$$TIS \cong \frac{2NM}{\pi \sum_{i=1}^{N-1} \sum_{j=0}^{M-1} \left[ \frac{1}{EIS_\theta(\theta_i, \phi_j)} + \frac{1}{EIS_\phi(\theta_i, \phi_j)} \right] \sin(\theta_i)}$$

Where: $EIS_x(\theta_i,\phi_j)=P_s/G_{x,EUT}(\theta_i,\phi_j)$ is the radiated effective isotropic sensitivity measured at each direction and polarization;
$P_s$ is the conducted sensitivity of the wireless device's receiver; and
$G_{x,EUT}(\theta_i,\phi_j)$ is the gain relative isotropic (in polarization x) of the wireless device's antenna (in this case, including mismatch and ohmic losses) in the direction $(\theta,\phi)$;
N=6 and M=12.

Radiated TIS and EIS tests are oriented to verify antenna performance. These kinds of tests provide exposure to all kinds of wireless device electromagnetic compatibility (EMC) issues, but from a RF verification perspective these tests require too much resources. The CTIA certification test plan contains test cases, which focus on determining if the sensitivity of a wireless device meets a minimum acceptable threshold. The test specifications set for sensitivity the Pass/Fail criteria.

Since wireless device performance has an impact on the performance of a network, operators and wireless device manufacturers have an interest in determining which wireless devices perform better on a live network and by what margin, compared to both the minimum acceptable levels and to other wireless device platforms. This level of RF design verification uses additional testing beyond the basic requirements of conformance testing. To truly characterize performance, a wireless device may be tested beyond the minimum threshold to the point at which the receiver (e.g., the receiver 114) actually hits its target BER. Furthermore, in spite of specifications outline testing just for selected frequency channels, network optimization process may verify the sensitivity for every channel. These requirements dramatically increase the amount of testing needed. For example, a Universal Mobile Telecommunications System (UMTS) mobile system, which has four GSM/EDGE bands, three WCDMA bands and three WLAN bands (e.g., interface 802.11 a, b and g), supports as many as 1675 frequency channels, including 971 GSM/EDGE, 655 WCDMA and 49 WLAN channels. TIS and EIS sensitivity testing requires time consuming path loss calibration for many channels and expansive far field test facilities.

Test methods based on international standards are not always efficient for routine preliminary testing. In many cases multiple prototype testing requires comparative results rather than absolute values. The present disclosure is concerned with presenting a fast and accurate method of relative radiated sensitivity degradation measurement. The method evaluates emissions and EMC issues for GSM/EDGE, UMTS, WLAN and/or GPS RF subsystems in the wireless device 102.

In one embodiment, the figure of merit used is radiated sensitivity referenced to antenna port (RSRAP). In other words, RSRAP represents the minimum mean power received at the wireless device 102 antenna port through antenna (e.g., through the antenna 118) at which the BER reaches a specific target value:

$RSRAP = P_{APmin}|_{BER=TR}$

Where $P_{AP}$=received power at antenna port of wireless device;
BER=bit error rate; and
TR=target rate.

Figure 5:
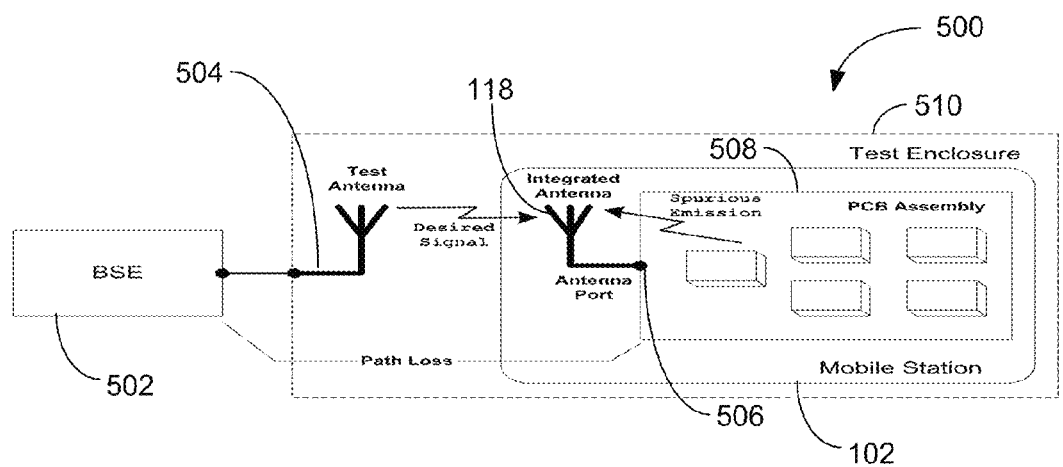
FIG. 5 shows in block diagram form a measurement setup for measuring sensitivity of a wireless device in accordance with one embodiment.

Reference is next made to FIG. 5, which shows in block diagram form a measurement setup 500 for measuring radiated sensitivity referenced to the antenna port of the wireless device 102 in accordance with one embodiment. The measurement setup 500 generally includes a base station emulator 502 connected to a test antenna 504, and the mobile station 102 having the integrated antenna 118, which is connected to an antenna port 506 of the wireless device 102. The wireless device 102 includes at least one printed circuit board (PCB) assembly 508. The measurement setup 500 may conduct the tests inside a test enclosure 510, which may contain the wireless device 102 as well as the test antenna 504. In one example, the test enclosure 510 may include a shielded box.

The base station emulator 502 may be implemented by any computing device having a processor operatively connected to a memory and having the antenna 504. In one example, the base station emulator 502 may also have a RF test module resident in the memory, similar to the RF test module 308 resident in the memory 300 of the wireless device 102. The base station emulator 502 may include any of the components belonging to the wireless device 102 with suitable modifications, described in connection with FIGS. 1, 3, and 4.

RSRAP aims to combine advantages from both of standard 3GPP and CTIA methods, which include the minimal technical resources of conducted sensitivity testing and the ability to discern all types of spurious signals of TIS and EIS testing. In one embodiment, a new approach is provided for compensation of path loss, which is a function of distance, fading conditions (e.g., reflections inside the test enclosure 510) and field strength variation related to near/far field effect. In contrast to the conventional path loss compensation method, the present method includes cable loss, air path loss, and test antenna gain, as well as total path loss and the gain of the integrated antenna 118 of wireless device 102. As a result, RSRAP is practically invariant to the distance from the base station emulator 502 to the wireless device 102 in a sufficiently wide range (e.g., either near or far field), elevation, azimuth angles of the wireless device 102, and the antenna gains of both the wireless device 102 and the base station emulator 502. In accordance with one embodiment, the test enclosure 510 may include and the tests may be performed in small anechoic shielded boxes, which normally have been used for conducted tests. At the same time, the effect of spurious signals on the results of sensitivity measurements may be measured with the same quality like in far field tests. The influence of spurious signals generated by the internal PCB assembly 508 and passed to the integrated antenna 118 is a near field effect, which is invariant to distance between the base station emulator 502 and the wireless device 102.

In one embodiment, the method applied, as described below in connection with FIG. 9, may employ an antenna port to antenna port path loss compensation approach for the over-the-air reception performance measurements. This method may compensate for changing antenna gain of the wireless device integrated antenna 118 and the test antenna 504, which occurs for the near field measurements in comparison to the far field measurements. As a result, sensitivity degradation due to the spurious emissions from the PCB assembly 508 of the wireless device may be measured in the near field as accurately as in the far field. Accordingly, a small shielded box may be used as the test enclosure 510 for the test setup instead of an expensive far field test facility.

One approach for performing a wireless reception performance test includes employing an antenna port to antenna port path loss compensation based on received signal strength measurements, as detailed herein. However, other approaches may be used to compensate for antenna port to antenna port path loss. For example, measurement and/or modeling results of antenna gains in the near field could be used as a basis for performing a path loss calculation and compensation and determining a path loss correction factor. All such approaches are intended to be embraced by the present description and claims.

RSRAP level may be represented as:

$$RSRAP = (N_{IN} + P_{SE})_{[dBm]} + + SNR_{OUT\,min[dB]} + NF_{[dB]} + PG_{[dB]}$$

Where: $N_{IN} = kT_0B$ = input thermal noise of receiver;
k = Boltzmann's constant;
$T_0$ = 290K;
B = RF bandwidth;
$P_{SE}$ = power of spurious emission (conducted and radiated);
$SNR_{OUT\,min}$ = minimum output signal-to-noise ratio at which BER=TR;
NF = noise figure; and
PG = progressive gain (if applicable).

Relative sensitivity degradation due to spurious emission is calculated as:

$$RSRAP_{DEGR[dB]} = (N_{IN} + P_{SE})_{[dBm]} - N_{IN[dBm]} =$$
$$= 10\log\left[1 + (P_{SE[dBm]} - N_{IN[dBm]})/10\right]$$

The measured value of RSRAP is described by formula:

$$RSRAP = P_{OUT\,min}|_{BER=TR} - PL_{CF}$$

Path loss calibration is based on received signal strength indication (e.g., by the RSSI 125) at the antenna port 506:

$$PL_{CF} = P_{OUT\_CL} - P_{AP\_CL} \cong P_{OUT\_CL} - RSSI_{CL}$$

Where: $PL_{CF}$ = path loss correction factor;
$P_{OUT\_CL}$, $P_{AP\_CL}$ and $RSSI_{CL}$ = output power of the base station emulator 502, received power at the antenna port 506 of the wireless device 102, and RSSI at calibration level, respectively.

To provide negligibly small (e.g., <0.1 dB) influence of thermal noise and spurious emission to path loss calibration, signal level for calibration may be chosen as:

$$P_{AP\_CL[dB]} \geq (N_{IN} + P_{SE})_{[dBm]} + 40_{[dB]}$$

For GSM receiver calibration, the level may be ≧−70 dBm.

The usage of RSRAP as a figure of merit of the wireless device 102 may simplify the RF verification process by segregating testing of mobile antenna gain and testing of relative sensitivity degradation caused by spurious signals from the PCB assembly. Relative sensitivity degradation may be measured for every channel with a simplified RSRAP method in near field. An automated test station may be used to perform this test. Antenna gain has a comparatively wide correlation interval in the frequency domain and usually it is sufficient to conduct verification test only for three channels (e.g., low, mid and high frequency ranges). This test may be done in far field. Combining test results of RSRAP for every channel with extrapolated results of antenna gain, TIS can be calculated for any channel.

The standard combined uncertainty of RSRAP measurements may be found as:

$$u_{c_{RSRAP}} = \sqrt{u_{P_{AP}|BER=TR}^2 + u_{C_{RSSI}}^2}$$

Where $u_{P_{AP}|BER=TR}$ = input power level uncertainty related to BER measurements; and
$u_{C_{RSSI}}$ = combined RSSI uncertainty.

With a sufficient number of samples providing statistical significance $u_{P_{AP}|BER=TR}$ may be as small as the resolution of measurements (±0.1 dB). The combined RSSI uncertainty is defined as root-sum-of-the-squares for RSSI calibration and RSSI measurement uncertainties:

$$u_{C_{RSSI}} = \sqrt{u_{RSSI\_CAL}^2 + u_{RSSI\_MEAS}^2}$$

The methodology of combined uncertainty calculation for calibration $U_{RSSI\_CAL}$ and measurements $U_{RSSI\_MEAS}$ is described in *Fundamentals of RF and Microwave Power Measurements*, Application Note 64-1C, Agilent Literature number 5965-6630E, 2001. Taking into account that power uncertainty level for BSE is ≦0.6 dB, $u_{C_{RSSI}}$ may be calculated as ±1.6 dB for the 95% confidence level. Low resolution of RSSI readings (e.g., 1 dB) and temperature instability of RSSI meter may cause the most significant contribution to combined RSSI uncertainty during the manufacturing calibration process. If RSSI calibration is performed for testing purposes in stable temperature conditions and RSSI measurements are conducted with an improved algorithm providing 0.1 dB resolution, $u_{C_{RSSI}}$ may be reached as small as ±0.8 dB and relative uncertainty ±0.3 dB.

Experiments have been performed to verify the accuracy of RSRAP measurements using the test setup shown in FIG. 5. The comparative measurements were conducted under following conditions:

System under test—GSM
Frequency bands—GSM-850 and PCS-1900 (every frequency channel was tested)
Azimuth angles of MS—0°, 90° and −90°
Elevation angle of MS—90°
Measurement distances—0.1 m and 1.3 m The measurement distances 0.1 m and 1.3 meters may represent near field and far field conditions. According to CTIA Certification; *Test Plan for Mobile Station over the Air Performance; Method of Measurement for Radiated RF Power and Receiver Performances*; Revision 2.2.1, January, 2008, which is hereby incorporated by reference in its entirety, the minimum measurement distances, which provide far-field conditions, are: 1.09 m for GSM-850 and 1.19 m for PCS-1900. Two different ETS-Lindgren test enclosures were chosen:

Table Top Test Enclosure 5240-24 (dimensions: 0.6×0.6× 0.6 m, weight 28 kg)—for near field test
Over-The-Air Test Lab AMS—8050 (dimensions: 2.52× 1.42×1.88 m, weight 820 kg)—for far field test Referring to FIG. 6, a graph is shown illustrating bit error rate (BER) versus time. To ensure that the wireless device 102 has been powered on long enough to have stabilized, BER versus time were measured, as shown in FIG. 6. Referring to FIG. 7, a graph is shown illustrating path loss (dB) versus samples. Path loss and sensitivity measurements were started when the wireless device 102 was stabilized in terms of temperature conditions, ten minutes after turning the wireless device 102 on. Variation of path loss measurements were verified with 100 samples and didn't exceed ±0.1 dB, as shown in FIG. 7.

Referring to FIG. 8, four graphs are shown illustrating sensitivity (dBm) as a function of frequency for two different frequency bands (GSM 850 Mhz and PCS 1900 Mhz) at two different distances (0.1 m and 1.3 m). Sensitivity degradation is clearly detectable at different measurement distances and azimuth angles. Narrowband interferer signals take place at 884 MHz, 1950 MHz and 1976 MHz. Analysis of the measurement results shows that relative root squared error of RSRAP doesn't exceed 0.3 dB in far and near fields. To aid the viewer, reference numerals have been added to the graphs and legends, where 802 represents RSRAP at zero degrees, 804 represents RSRAP at ninety degrees, 806 represents RSRAP at negative ninety degrees, and 808 represents conducted sensitivity.

The proposed figure of merit (RSRAP) and test methodology has been developed as a basis to a new approach to RF design verification of the wireless device 102. It is proven that sensitivity degradation due to spurious emission in near field is invariant to distance between BSE and MS over a wide range. Estimated accuracy performances match the experimental results. Accuracy of the new test method is sufficient for design verification purposes; the absolute uncertainty of measurements is ±0.8 dB and relative is ±0.3 dB.

The RSRAP test methodology has been validated with multiple experimental measurements for GSM, GPRS, EDGE, UMTS, WLAN and GPS systems. Its application provides significant simplification of development process and saving of resources. The impact of spurious emission can be automatically tested using table top test set instead of conventional far field test set.

Figure 9:
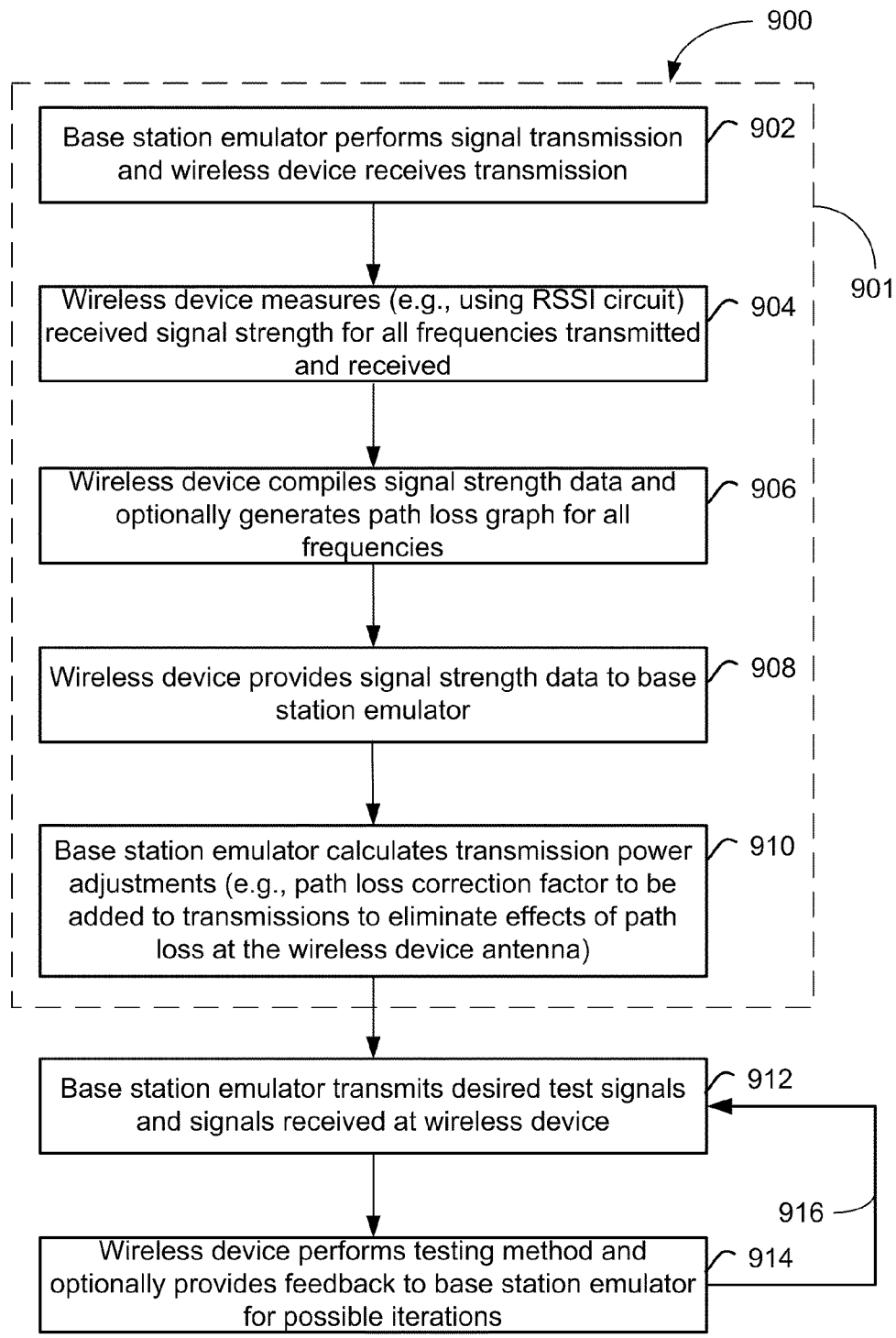
FIG. 9 shows in flow chart form a method for performing a sensitivity test in accordance with one embodiment.

Referring to FIG. 9, a flow chart is shown illustrating a method 900 for performing a sensitivity test in accordance with one embodiment. In one example, the method 900 may be performed using a test setup similar to the test setup 500 described in connection with FIG. 5. Blocks 902, 904, 906, 908, and 910 are referred to generally as block 901. At block 901, a path loss correction factor is generated to compensate for path loss from the base station emulator antenna port 504 to the antenna port 506 of the wireless device 102. As described above, the path loss correction factor may be generated in any suitable manner, such as by using the results of modelling, mathematical modelling, empirical results, theoretical calculations, or any other suitable method. In one example, received signal strength measurements may be used as a basis for generating the path loss correction factor. This exemplary approach is described in connection with the blocks, 902, 904, 906, 908, and 910.

At a first block, the base station emulator (e.g., the base station emulator 502) performs a signal transmission from the test antenna 504 including a number of frequency components including at least one frequency that is to be tested using the method 900. In one example, a signal sweep is performed that sweeps all frequency bands or ranges that are to be tested using the method 900. However, the transmission performed at the block 902 may include any number of frequencies or frequency ranges, depending on the design criteria of a particular application. Further At the block 902, the wireless device 102 receives, using the integrated antenna 118, the transmission generated by the base station emulator 502.

Next, at a block 904, the wireless device 102 processes the received signals (e.g., measures the received signal strength using the RSSI 125), which generates data related to received signal strength for at least one of the frequencies that were transmitted by the base station emulator 502 and were received by the wireless device 102. In one example, data related to received signal strength may be generated for all of the frequencies that were transmitted by the base station emulator 502 and were received by the wireless device 102.

Next, at a block 906, the wireless device 102 compiles the signal strength data generated at the block 904. In one example, the compilation of the signal strength data may be in a raw data form, a chart form, or even a graph form. In one example; the compiled data may be presented as a path loss chart or graph illustrating the path loss between the base station emulator 502 test antenna 504 and the wireless device 102 antenna 118, for each of the frequencies that was transmitted and received.

Next, at a block 908, the wireless device 102 provides the signal strength data to the base station emulator 502. This may occur wirelessly using the antenna 120 to transmit the data to the antenna 504. Alternatively, there may be a physical cable connection (e.g., a USB connection) between the wireless device 102 and the base station emulator 502 that may be used for exchanging data and/or timing and/or control signals during the method 900 other than the test signals, for example generated at the blocks 902 and 912.

Next, at a block 910, the base station emulator 502 uses the signal strength data provided to the base station emulator 502 to calculate a path loss correction factor for each of the test frequencies for which the base station emulator 502 has the signal strength data. The base station emulator 502 subsequently uses the path loss correction factor for a given frequency by adding the correction factor to the transmission power for that given frequency when a subsequent transmission test is performed, thereby eliminating the path loss effect from the test such that the transmission arrives at the wireless device antenna 118 effectively without any path loss.

Next, at a block 912, the base station performs the desired signal transmissions from the test antenna 504 including a further signal transmission having at least one frequency that is to be tested using the method 900. In one example, a signal sweep is performed generating a transmission that sweeps all frequency ranges that are to be tested using the method 900. Ideally, the frequencies transmitted at the block 912 are the same frequencies that were previously transmitted at the block 902, the difference being that the transmission powers for the frequencies have been adjusted (e.g., increased) by the respective path loss correction factors for each of the frequencies. Again, the transmission performed at the block 912 may include any number of frequencies or frequency ranges, depending on the design criteria of a particular application. Further at the block 912, the wireless device 102 receives, using the integrated antenna 118, the transmissions generated by the base station emulator 502.

Next, at a block 914, the wireless device performs the testing method to determine the desired performance specifications or record the desired measurables from the transmission tests. In one example, the minimum mean power received at the wireless device 102 antenna port through antenna 118 at which the BER reaches a specific target value is calculated, according to the formulae outlined in detail above. Alternatively, a loopback BER method may be performed, where the wireless device 102 demodulates the received signals, decodes the received signals, and re-encodes the received signals that include any errors in the received signal and the re-encoded signal is then returned to the base station emulator 502 (e.g., retransmitted using antenna 120 to the base station emulator 502 antenna 504 or using a direct cable connection). The base station emulator 502 may then compare the signal received by the wireless device 102 to the signal previously transmitted by the base station emulator 502 and may perform calculations on differences (e.g., errors) found, for example the BER.

Using this approach, the minimum mean power received at the wireless device 102 antenna port through antenna 118 at which the BER reaches a specific target value may be determined using iterations of the test, indicated by loopback arrow 916. Alternatively, the block 914 may implement the baseband BER method or the loopback BER method. Both the loopback BER method and the baseband BER method are described in detail in *Agilent application note* 1314, *Testing and Troubleshooting Digital RF Communications Receiver Designs,* 1999, 2000, *Agilent Technologies,* the entirety of which is hereby incorporated by reference in its entirety.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for performing a wireless reception performance test on a wireless device in wireless communication with a base station emulator, the method comprising:

generating a path loss correction factor, the path loss correction factor for compensating for path loss from an antenna port of the base station emulator to an antenna port of the wireless device, generating the path loss correction factor comprising:

receiving a signal transmission transmitted by the base station emulator, the signal transmission including a number of frequency components;

measuring received signal strength for at least one of the number of frequency components;

compiling signal strength data for the at least one of the number of frequency components; and providing the signal strength data to the base station emulator;

receiving at least a further signal transmission from the base station emulator, the further signal transmission including the path loss correction factor such that the transmission power of the further signal transmission removes the effect of path loss from the wireless reception performance test;

demodulating the received further signal transmission;

decoding the demodulated received further signal transmission;

re-encoding the decoded received further signal transmission including any errors in the received further signal transmission; and providing the re-encoded received further signal transmission back to the base station emulator for error analysis.

2. The method according to claim 1, wherein the number of frequency components comprises a frequency sweep across all frequency bands that are to be tested in the wireless reception performance test, received signal strength is measured for all received frequency components, and the signal strength data is compiled for all received frequency components.

3. The method according to claim 1, wherein the wireless reception performance test includes a sensitivity measurement test.

4. The method according to claim 1, wherein the compiled signal strength data includes path loss data for the at least one of the number of frequency components.

5. A method for performing a wireless reception performance test between a wireless device and a base station emulator, the method comprising:

generating a path loss correction factor, the path loss correction factor for compensating for path loss from an antenna port of the base station emulator to an antenna port of the wireless device, generating the path loss correction factor comprising:

transmitting from the base station emulator a signal transmission including a number of frequency components;

receiving at the wireless device the signal transmission;

measuring in the wireless device received signal strength for at least one of the number of frequency components;

compiling in the wireless device signal strength data for the at least one of the number of frequency components;

providing the signal strength data to the base station emulator from the wireless device: and calculating in the base station emulator a path loss correction factor for each of the at least one of the number of frequency components;

transmitting from the base station emulator at least a further signal transmission, the further signal transmission including the path loss correction factor such that the transmission power of the further signal transmission removes the effect of path loss from the wireless reception performance test;

receiving at the wireless device the further signal transmission;

demodulating in the wireless device the received further signal transmission;

decoding in the wireless device the demodulated received further signal transmission;

re-encoding in the wireless device the decoded received further signal transmission including any errors in the received further signal transmission; and providing to the base station emulator from the wireless device the re-encoded received further signal transmission for error analysis.

6. The method according to claim 5, wherein the wireless reception performance test is performed in a test enclosure.

7. The method according to claim 6, wherein the test enclosure includes a shielded box.

8. The method according to claim 5, wherein the number of frequency components comprises a frequency sweep across all frequency bands that are to be tested in the wireless reception performance test, received signal strength is measured for all received frequency components, and the signal strength data is compiled for all received frequency components.

9. A method in a base station emulator for performing a wireless reception performance test on a wireless device, the method comprising:

generating a path loss correction factor, the path loss correction factor for compensating for path loss from an antenna port of the base station emulator to an antenna port of the wireless device, generating the path loss correction factor comprising:

transmitting to the wireless device a signal transmission including a number of frequency components;

receiving from the wireless device received signal strength data for the number of frequency components; and calculating a path loss correction factor for each of the number of frequency components;

transmitting to the wireless device at least a further signal transmission, the further signal transmission including the path loss correction factor such that the transmission power of the further signal transmission removes the effect of path loss from the wireless reception performance test; and receiving at the base station emulator for error analysis a re-encoded version of the at least one further signal transmission, the re-encoded version of the at least one further signal transmission generated by the wireless device having demodulated, decoded, and re-encoded the received further signal transmission including any errors in the received further signal transmission.

10. The method according to claim 9, wherein the number of frequency components comprises a frequency sweep across all frequency bands that are to be tested in the wireless reception performance test.

11. The method according to claim 9, wherein the wireless reception performance test includes a sensitivity measurement test.

12. The method according to claim 5, wherein the wireless reception performance test includes a sensitivity measurement test.

13. The method according to claim 9, wherein the calculating a path loss correction factor includes path loss data for the at least one of the number of frequency components.

* * * * *